(12) United States Patent
Miyata

(10) Patent No.: US 11,704,208 B2
(45) Date of Patent: Jul. 18, 2023

(54) STORAGE SYSTEM AND INFORMATION PROCESSING METHOD

(71) Applicant: FUJITSU LIMITED, Kawasaki (JP)

(72) Inventor: Shinya Miyata, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/579,634

(22) Filed: Jan. 20, 2022

(65) Prior Publication Data
US 2022/0365856 A1 Nov. 17, 2022

(30) Foreign Application Priority Data
May 12, 2021 (JP) .................. 2021-080952

(51) Int. Cl.
*G06F 11/20* (2006.01)
*G06F 3/06* (2006.01)

(52) U.S. Cl.
CPC .......... *G06F 11/2071* (2013.01); *G06F 3/065* (2013.01); *G06F 3/0619* (2013.01); *G06F 3/0683* (2013.01); *G06F 2201/85* (2013.01)

(58) Field of Classification Search
CPC .... G06F 11/2071; G06F 3/0619; G06F 3/065; G06F 3/0683
See application file for complete search history.

(56) References Cited

U.S. PATENT DOCUMENTS

| | | | |
|---|---|---|---|
| 9,864,663 B2* | 1/2018 | Khemani | G06F 12/0893 |
| 10,228,995 B2* | 3/2019 | Silversides | G06F 3/064 |
| 2011/0296129 A1 | 12/2011 | Arai et al. | |
| 2016/0321155 A1 | 11/2016 | Hirano | |

FOREIGN PATENT DOCUMENTS

| | | |
|---|---|---|
| JP | 2013-515980 A | 5/2013 |
| JP | 2016-212516 A | 12/2016 |
| JP | 2018-060419 A | 4/2018 |

* cited by examiner

*Primary Examiner* — Nadeem Iqbal
(74) *Attorney, Agent, or Firm* — Fujitsu Patent Center

(57) ABSTRACT

A storage system includes a plurality of controllers and a relay device and is configured to perform mirror transfer between the plurality of controllers, the relay device detects an abnormality in each device located between the plurality of controller and aggregates error information in a register, and a first controller module that is a source of performing the mirror transfer among the plurality of controllers reads content of the register and determines whether the mirror transfer is completed normally, after the mirror transfer is performed.

8 Claims, 11 Drawing Sheets

STORAGE SYSTEM AND INFORMATION PROCESSING METHOD

CROSS-REFERENCE TO RELATED APPLICATION

This application is based upon and claims the benefit of priority of the prior Japanese Patent Application No. 2021-80952, filed on May 12, 2021, the entire contents of which are incorporated herein by reference.

FIELD

The embodiment discussed herein is related to a storage system and an information processing method.

BACKGROUND

A storage system includes controller modules (CMs) and a front-end router (FRT). Each of the CMs receives data from a host and performs processing. The FRT couples the individual CMs to each other and performs routing of data via CM-to-CM communication. The CMs and the FRT may be coupled to each other by, for example, Peripheral Component Interconnect (PCI) Express (PCIe).

Japanese Laid-open Patent Publication No. 2018-060419, Japanese Laid-open Patent Publication No. 2016-212516, and Japanese National Publication of International Patent Application No. 2013-515980 are disclosed as related art.

SUMMARY

According to an aspect of the embodiments, a storage system includes a plurality of controllers and a relay device and is configured to perform mirror transfer between the plurality of controllers, the relay device detects an abnormality in each device located between the plurality of controller and aggregates error information in a register, and a first controller module that is a source of performing the mirror transfer among the plurality of controllers reads content of the register and determines whether the mirror transfer is completed normally, after the mirror transfer is performed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
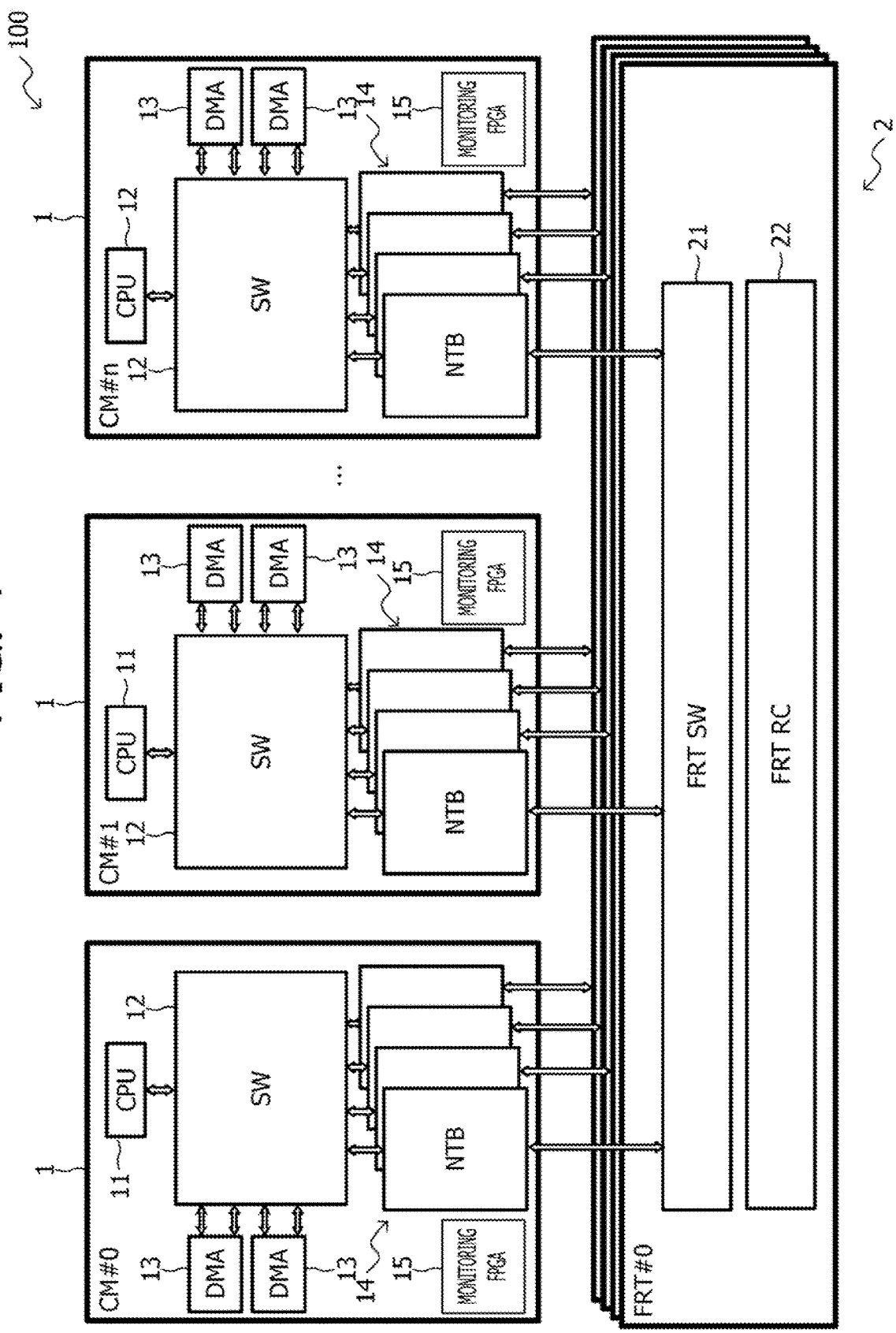
FIG. 1 is a block diagram schematically illustrating an example of a hardware configuration of a storage system according to an embodiment.

Each of the CMs may include a switch (SW) and a non-transparent bridge (NTB). The SW performs routing of a central processing unit (CPU), a direct memory access (DMA), and the NTB. The SW may be a PCIe SW if a path between the CM and the FRT is based on PCIe. The NTB performs address conversion for a transfer packet in order to transfer data to other domains (the FRT and another CM). The NTB may be a PCIe SW if the path between the CM and the FRT is based on PCIe.

In CM-to-CM communication, data transfer (in other words, mirroring) for maintaining the redundancy of user data is frequently performed. In such data transfer, if the transfer is unable to be correctly performed because of an internal abnormality of a device in a path or the like, there is a possibility that the redundancy may no longer be maintained and a system down may occur. In CM-to-CM communication via which such data transfer is performed, whether data has been normally transferred is guaranteed with a delivery guarantee function by hardware.

In the delivery guarantee function, after CM-to-CM communication for writing for data redundancy is performed, reading is performed, by using the same path as that used in this CM-to-CM communication, on the address on which the writing has been performed. In this manner, delivery guarantee reading is performed. As a result of the reading processing completing normally, it is guaranteed that there is no abnormality in the path of the CM-to-CM communication via which the writing has been performed. On the other hand, if there is an abnormality in the path at the time of the writing, a CM-to-CM immediate disconnect function disconnects the path in terms of hardware, causing the delivery guarantee reading to fail.

The delivery guarantee function and the CM-to-CM immediate disconnect function are implemented by a unique function of the SW or the NTB (for example, a PCIe SW) in the CM. For this reason, depending on the type of the SW or the NTB included in the CM, the delivery guarantee function or the CM-to-CM immediate disconnect function may not be implemented.

In one aspect, it is an object to, in a controller module in a storage system, implement a general-purpose switch and reduce the time taken for delivery guarantee.

[A] Embodiment

An embodiment will be described below with reference to the drawings. Note that the embodiment described below is merely illustrative and is not intended to exclude employment of various modification examples or techniques that are not explicitly described in the embodiment. For example, the present embodiment may be implemented by variously modifying the embodiment within a scope not departing from the gist of the embodiment. Each of the drawings is not intended to indicate that only the elements illustrated in the drawing are included, and thus other functions or the like may be included.

Since each of the same reference signs denotes substantially the same portion in the drawings, the description thereof is omitted below.

[A-1] Configuration Example

FIG. 1 is a block diagram schematically illustrating an example of a hardware configuration of a storage system 100 according to an embodiment.

The storage system 100 includes a plurality of CMs 1 (in other words, CMs #0 to #n) and a plurality of FRTs 2 (in other words, FRTs #0 to #n).

The CMs 1 are an example of controller modules, and each include a CPU 11, a SW 12, one or more (two in the illustrated example) DMAs 13, one or more (four in the illustrated example) NTBs 14, and a monitoring field-programmable gate array (FPGA) 15.

The CPU 11 is, for example, a processing device that performs various control and computations. The CPU 11 implements various functions by executing an operating system (OS) and a program stored in a memory 110 (described later by using FIGS. 4 and 5).

The program for implementing the various functions may be provided in a form in which the program is recorded on a computer-readable recording medium such as, for example, a flexible disk; an optical disc such as a compact disc (CD) (such as a CD-read-only memory (CD-ROM), a CD-recordable (CD-R), or a CD-rewritable (CD-RW)), a Digital Versatile Disc (DVD) (such as a DVD-ROM, a DVD-random-access memory (DVD-RAM), a DVD-R, a DVD+R, a DVD-RW, a DVD+RW, or a High Definition (HD) DVD), or a Blu-ray disc; a magnetic disk; or a magneto-optical disk. The computer (the CPU 11 in the present embodiment) may read the program from the above-described recording medium via a reading device (not illustrated), transfer the program to and store the program in an internal recording device or an external recording device, and use the program. The program may be recorded on a storage device (recording medium) such as, for example, a magnetic disk, an optical disc, or a magneto-optical disk, and provided from the storage device to the computer via a communication path.

When the various functions are implemented, the program stored in the internal storage device (the memory 110 in the present embodiment) may be executed by the computer (the CPU 11 in the present embodiment). The computer may read and execute the program recorded on the recording medium.

The SW 12 performs routing of the CPU 11, the DMAs 13, and the NTBs 14. The SW 12 may be a PCIe SW if paths between the CM 1 and the FRTs 2 are based on PCIe.

Each of the DMAs 13 implements data transfer between a main memory and each module without through the CPU 11.

Each of the NTBs 14 performs address conversion for a transfer packet in order to transfer data to other domains (the FRT 2 and another CM 1). Each of the NTBs 14 may be a PCIe SW if the paths between the CM 1 and the FRTs 2 are based on PCIe.

The monitoring FPGA 15 is an integrated circuit that monitors states inside the CM 1.

Each of the FRTs 2 is an example of a relay device, and includes an FRT SW 21 and an FRT RC 22.

The FRT SW 21 relays communication between the FRT 2 and the CMs 1.

The FRT RC 22 aggregates error information on an abnormality detected in each of devices of the CMs 1 and the FRT 2.

Figure 2:
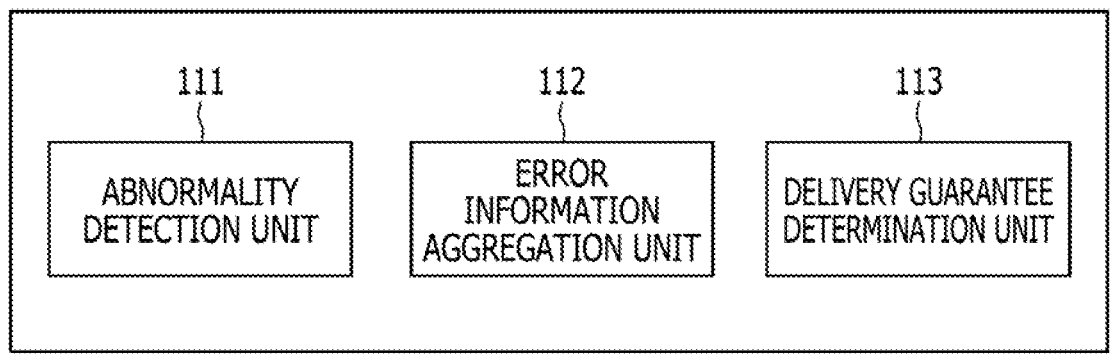
FIG. 2 is a block diagram schematically illustrating an example of a software configuration of the storage system illustrated in FIG. 1.

FIG. 2 is a block diagram schematically illustrating an example of a software configuration of the storage system 100 illustrated in FIG. 1.

The storage system 100 functions as an abnormality detection unit 111, an error information aggregation unit 112, and a delivery guarantee determination unit 113.

The abnormality detection unit 111 detects an abnormality that has occurred in each device.

The error information aggregation unit 112 aggregates error information indicating an abnormality that has occurred in each CM 1 and the FRT SW 21.

By reading the error information aggregated by the error information aggregation unit 112, the delivery guarantee determination unit 113 determines whether mirror transfer between the CMs 1 is completed normally, thereby implementing a delivery guarantee function.

Figure 3:
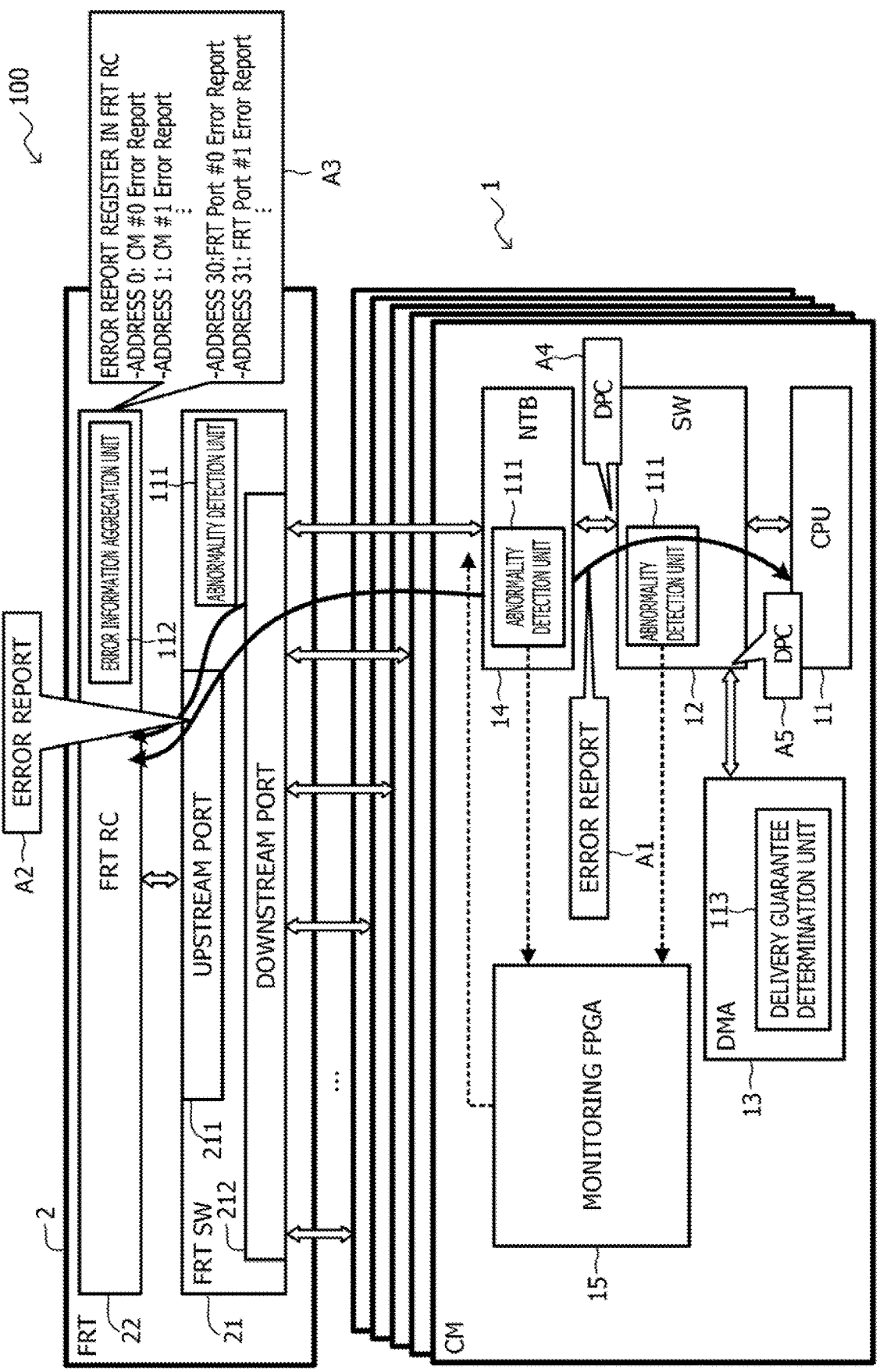
FIG. 3 is a block diagram for describing a delivery guarantee process performed in the storage system illustrated in FIG. 1.

FIG. 3 is a block diagram for describing a delivery guarantee process performed in the storage system 100 illustrated in FIG. 1.

In the storage system 100 illustrated in FIG. 3, the abnormality detection unit 111 is disposed in the SW 12 and the NTB 14 of the CM 1 and is also disposed in the FRT SW 21 of the FRT 2. The error information aggregation unit 112 is disposed in the FRT RC 22 of the FRT 2. The delivery guarantee determination unit 113 is disposed in the DMA 13 of the CM 1.

In the storage system 100 illustrated in FIG. 3, the FRT SW 21 of the FRT 2 includes an upstream port 211 and a downstream port 212. The upstream port 211 relays data communication between the FRT SW 21 and the FRT RC 22. The downstream port 212 relays communication between the FRT SW 21 and each CM 1.

In response to data being written from a host and being stored in a cache via the CPU 11, the cached data is written to the mirror-transfer-destination CM 1 via the DMA 13.

In the example illustrated in FIG. 3, at the time of mirror transfer, an abnormality is detected by the abnormality detection unit 111 in a coupling port of the NTB 14 to the FRT 2 or in each downstream port 212 of the FRT SW 21 as indicated by a reference sign A1.

As indicated by a reference sign A2, an error report (for example, a message request of the PCIe standard) is aggregated in the error information aggregation unit 112 of the FRT RC 22.

As indicated by a reference sign A3, the FRT RC 22 holds a flag indicating the presence or absence of occurrence of an error, at each address of an error report register (not illustrated). In FIG. 3, for example, an error report from the CM #0 is registered at an address "0", and an error report from the CM #1 is registered at an address "1".

If an abnormality occurs a SW 12 side port of the NTB 14 or upstream of the SW 12 side port (in other words, on the CPU 11 side), an error report may be transferred toward the CPU 11. As indicated by reference signs A4 and A5, a path is disconnected by a Downstream Port Containment (DPC) function at a DMA 13 side port and an NTB 14 side port of the SW 12.

After performing writing to the mirror-transfer-destination CM 1, the delivery guarantee determination unit 113 of the DMA 13 reads content at all the addresses in the error information aggregation unit 112 of the FRT RC 22. Reading by the delivery guarantee determination unit 113 is performed every time writing to the mirror-transfer-destination CM 1 is performed. Delivery guarantee reading by the DMA 13 may be performed after a sufficient time elapses from the writing to the mirror-transfer-destination CM 1.

The delivery guarantee determination unit 113 checks the read information, and if there is no error flag, determines that mirroring is completed normally. On the other hand, if there is an error flag or if the reading from the error information aggregation unit 112 fails, the delivery guarantee determination unit 113 determines that the mirror transfer has failed because of an abnormality midway of the path.

For example, the FRT 2 detects an abnormality in each of the devices located between the plurality of CMs 1 and aggregates error information in a register. The CM 1 that is a source of performing the mirror transfer reads content of the register and determines whether the mirror transfer is completed normally, after the mirror transfer is performed.

Thus, even if mirror transfer fails because of the occurrence of a temporary path abnormality, the error report is transmitted to the FRT RC 22. Thus, delivery guarantee determination may be performed without disconnecting the path.

The CM 1 that is the source of performing the mirror transfer may determine that the mirror transfer is not completed normally when error information is written in the register. The CM 1 that is the source of performing the mirror transfer may determine that the mirror transfer is not completed normally when the CM 1 is unable to read the content of the register.

The FRT 2 aggregates the error information by associating each device with a corresponding address of the register. The CM 1 that is the source of performing the mirror transfer may read the content at all the addresses of the register and determine whether the mirror transfer is completed normally. The CM 1 that is the source of performing the mirror transfer may read the content at an address related to the path of the mirror transfer among all the addresses of the register and determine whether the mirror transfer is completed normally.

Figure 4:
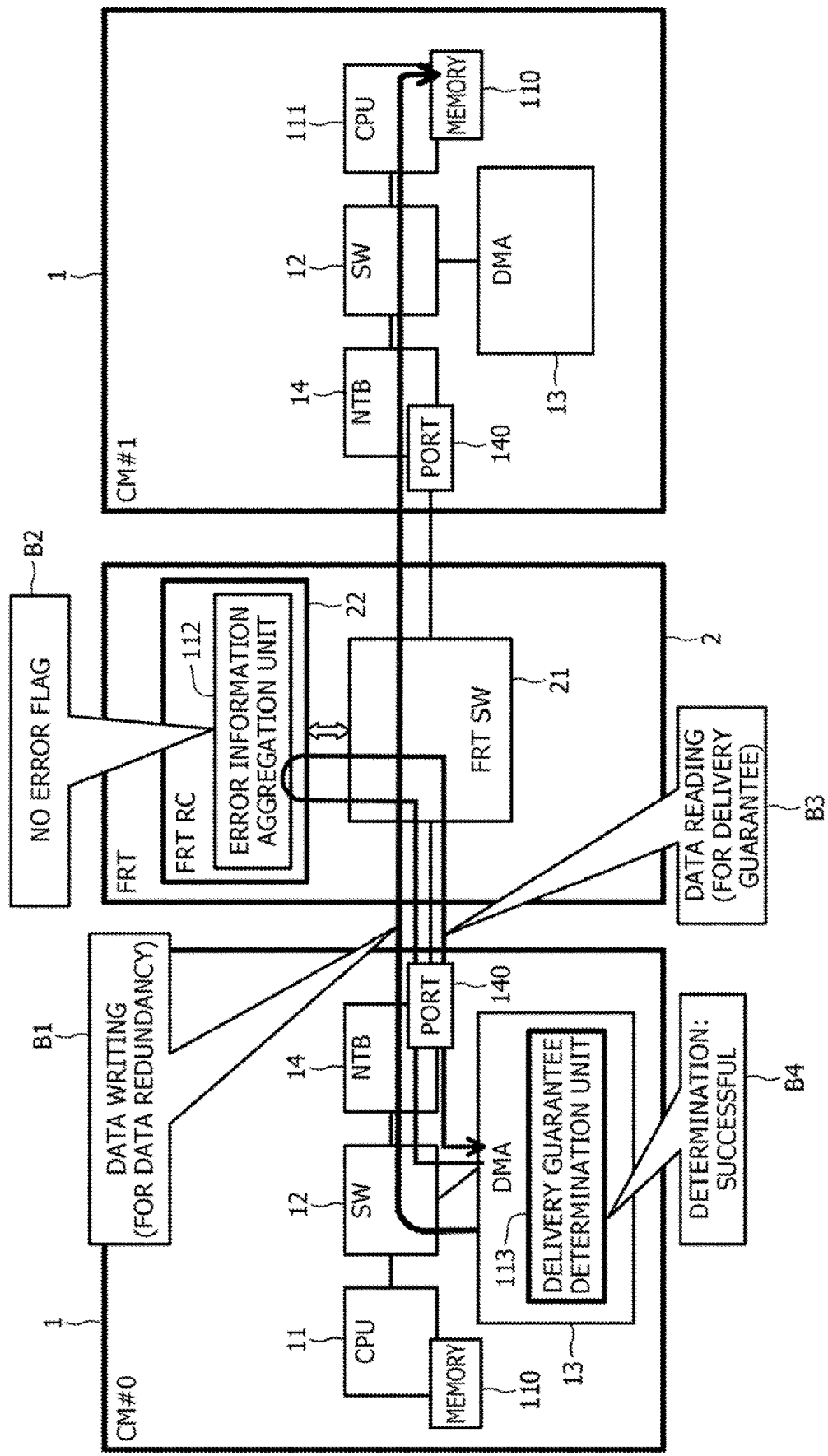
FIG. 4 is a diagram for describing a normal operation performed in the delivery guarantee process illustrated in FIG. 3.

FIG. 4 is a diagram for describing a normal operation performed in the delivery guarantee process illustrated in FIG. 3.

It is assumed that each of the CMs 1 illustrated in FIG. 4 includes the memory 110 and a port 140 of the NTB 14 in addition to the configuration illustrated in FIG. 1 or the like.

As indicated by a reference sign B1, data writing for data redundancy is performed from the DMA 13 of the CM #0 to the memory 110 of the CM #1.

In the example illustrated in FIG. 4, no abnormality has occurred in any portion of the path. Thus, as indicated by a reference sign B2, the error information aggregation unit 112 of the FRT RC 22 holds a no-error-flag state in the error report register.

As indicated by a reference sign B3, the delivery guarantee determination unit 113 of the DMA 13 performs data reading for delivery guarantee, on the error information aggregation unit 112 of the FRT RC 22.

As indicated by a reference sign B4, the delivery guarantee determination unit 113 recognizes that delivery guarantee is determined to be successful since no error flag is held in the error information aggregation unit 112.

Figure 5:
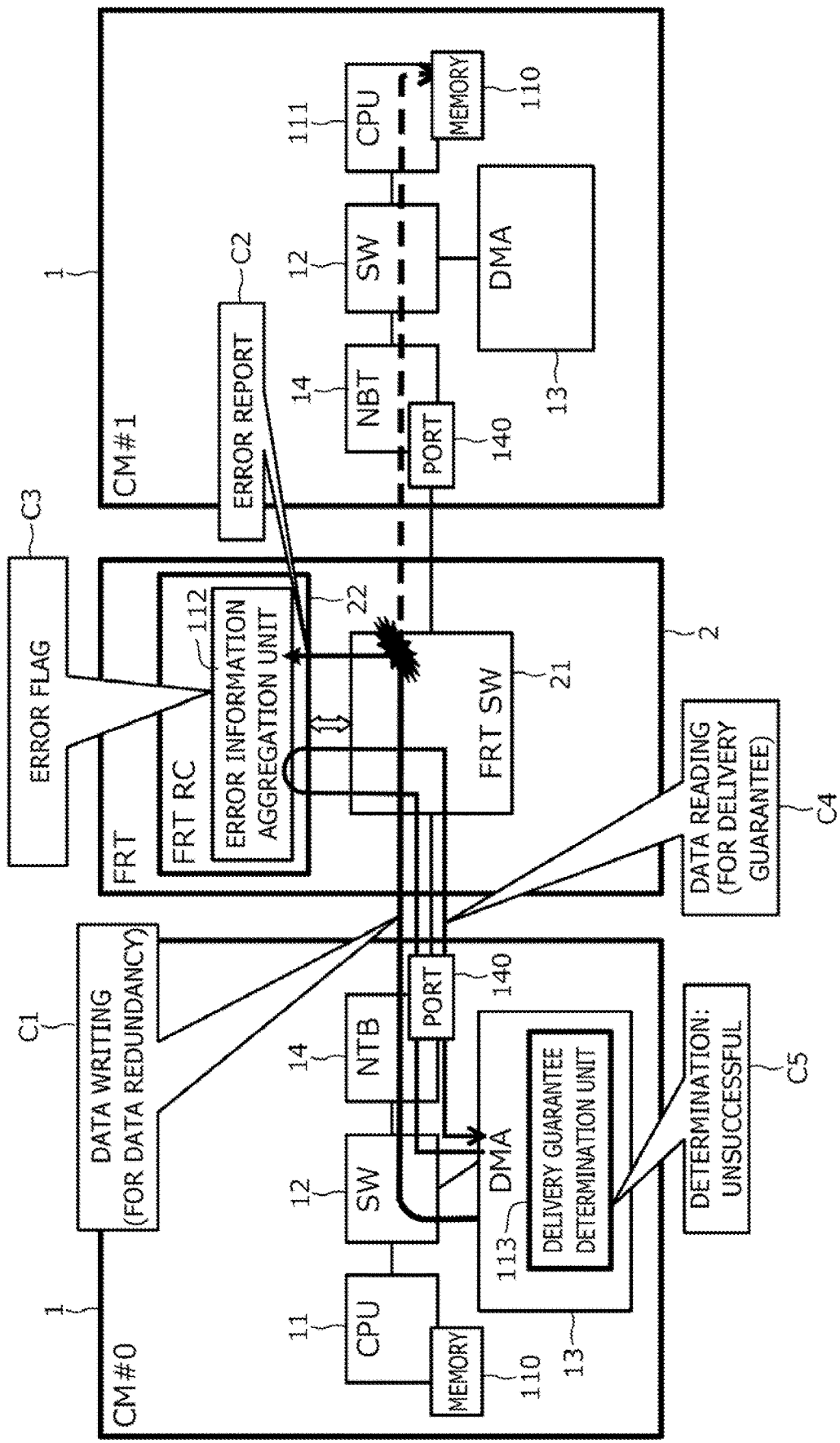
FIG. 5 is a diagram for describing an operation performed in a case of an abnormality in the delivery guarantee process illustrated in FIG. 3.

FIG. 5 is a diagram for describing an operation performed in a case of an abnormality in the delivery guarantee process illustrated in FIG. 3.

As indicated by a reference sign C1, data writing for data redundancy is performed from the DMA 13 of the CM #0 to the memory 110 of the CM #1.

In the example illustrated in FIG. 5, an abnormality occurs in the FRT SW 21 and an error report is transmitted to the error information aggregation unit 112 of the FRT RC 22 as indicated by a reference sign C2. Thus, the error information aggregation unit 112 registers the error flag in the error report register as indicated by a reference sign C3.

As indicated by a reference sign C4, the delivery guarantee determination unit 113 of the DMA 13 performs data reading for delivery guarantee, on the error information aggregation unit 112 of the FRT RC 22.

As indicated by a reference sign C5, the delivery guarantee determination unit 113 recognizes that delivery guarantee is determined to be unsuccessful since the error flag is held in the error information aggregation unit 112.

[A-2] Operation Example

Figure 6:
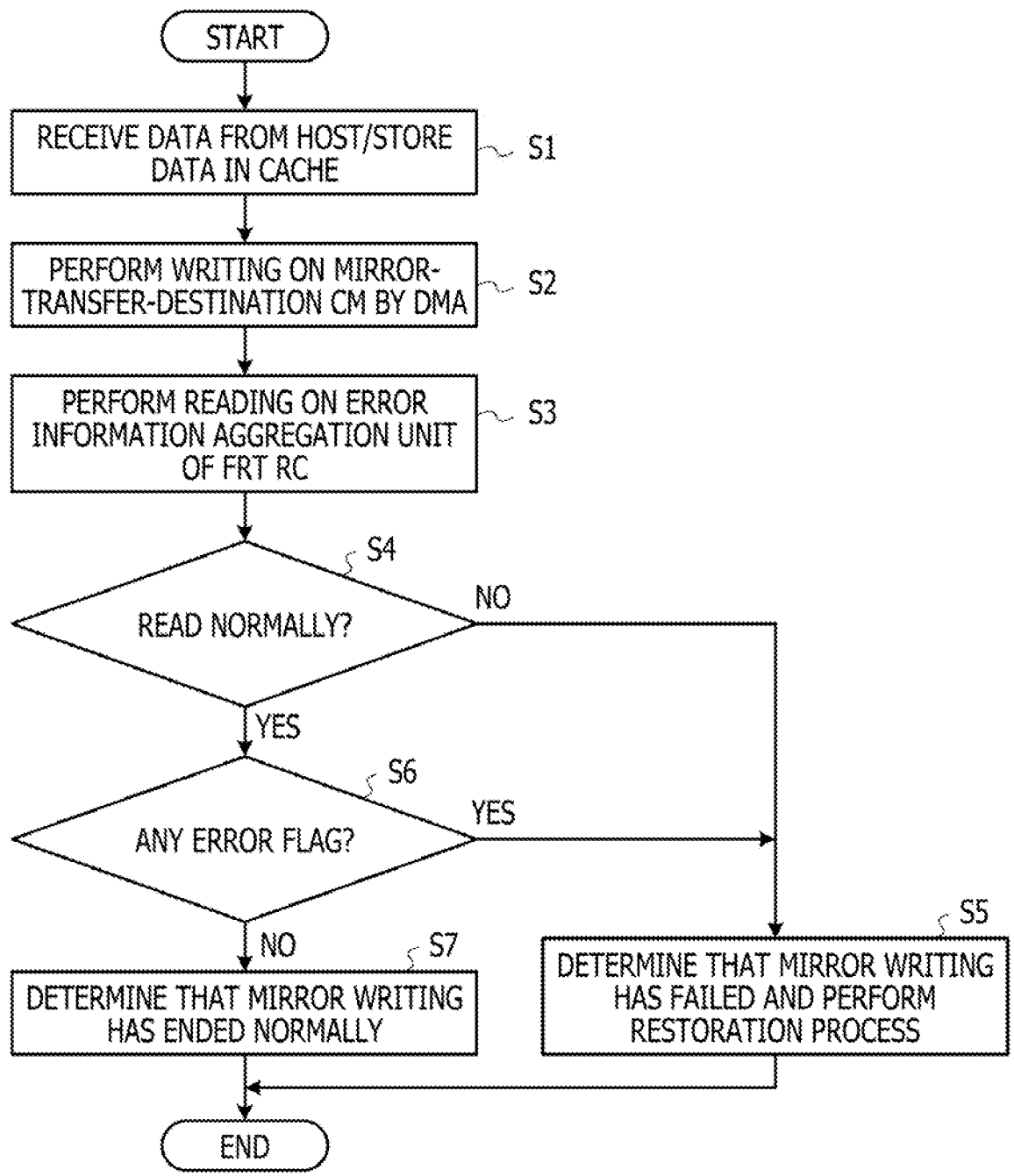
FIG. 6 is a flowchart for describing the delivery guarantee process performed in the storage system illustrated in FIG. 1.

The delivery guarantee process performed in the storage system 100 illustrated in FIG. 1 will be described in accordance with a flowchart (step S1 to S7) illustrated in FIG. 6.

The DMA 13 receives data from a host and stores the data in a cache (step S1).

The DMA 13 writes the data to the mirror-transfer-destination CM 1 (step S2).

The DMA 13 performs reading on the error information aggregation unit 112 of the FRT RC 22 (step S3).

The DMA 13 determines whether the reading is performed on the error information aggregation unit 112 normally (step S4).

If the reading is not performed normally (see a NO route in step S4), the DMA 13 determines that the mirror writing has failed, and performs a restoration process (step S5). The delivery guarantee process then ends.

On the other hand, if the reading is performed normally (see a YES route in step S4), the DMA 13 determines whether there is an error flag in the result read from the error information aggregation unit 112 (step S6).

If there is an error flag (see a YES route in step S6), the process proceeds to step S5.

On the other hand, if there is no error flag (see a NO route in step S6), the DMA 13 determines that the mirror writing has ended normally (step S7). The delivery guarantee process then ends.

Details of an operation performed by the delivery guarantee determination unit 113 in the delivery guarantee process illustrated in FIG. 6 will be described next in accordance with a flowchart (steps S11 to S20) illustrated in FIG. 7.

The delivery guarantee determination unit 113 writes data to the mirror-transfer-destination CM 1 (step S11).

The delivery guarantee determination unit 113 stands by for a predetermined time before operating (step S12).

By reading the content at all the addresses in the error information aggregation unit 112 of the FRT RC 22, the delivery guarantee determination unit 113 performs delivery guarantee reading (step S13). Processing performed by the FRT RC 22 in response to a read request from the delivery guarantee determination unit 113 will be described later by using step S21 in FIG. 8.

In response to a read response from the FRT RC 22, which will be described later by using step S24 in FIG. 8, the delivery guarantee determination unit 113 determines whether there is a read response (step S14).

If there is a read response (see a YES route in step S14), the delivery guarantee determination unit 113 checks the presence or absence of an error flag from each port in the mirror writing path, in the read response (step S15).

The delivery guarantee determination unit 113 determines whether there is an error flag in the read response (step S16).

If there is no error flag (see a NO route in step S16), the delivery guarantee determination unit 113 determines that delivery guarantee is successful (step S17).

The delivery guarantee determination unit 113 issues a notification about the completion of the delivery guarantee process to the CPU 11 (step S18). The operation performed by the delivery guarantee determination unit 113 in the delivery guarantee process then ends.

If there is no read response (see a NO route in step S14) or if there is an error flag (see a YES route in step S16), the delivery guarantee determination unit 113 determines that delivery guarantee is unsuccessful (step S19).

The delivery guarantee determination unit 113 issues a notification about an abnormality in the delivery guarantee process to the CPU 11 (step S20). The operation performed by the delivery guarantee determination unit 113 in the delivery guarantee process then ends.

Details of an operation performed by the FRT RC 22 in the delivery guarantee process illustrated in FIG. 6 will be described next in accordance with a flowchart (steps S21 to S24) illustrated in FIG. 8.

Figure 7:
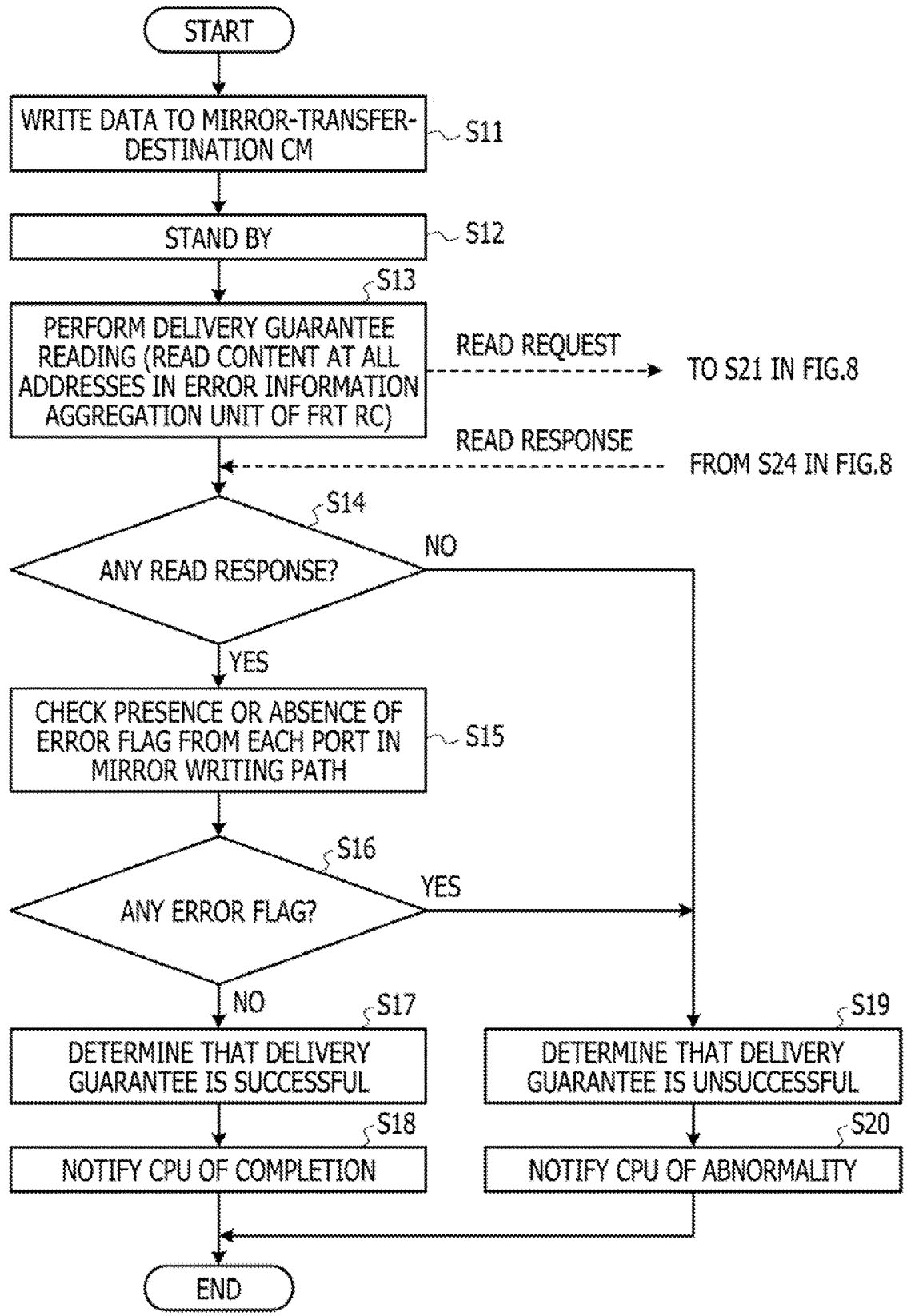
FIG. 7 is a flowchart for describing details of an operation performed by a delivery guarantee determination unit in the delivery guarantee process illustrated in FIG. 6.

The FRT RC 22 monitors the presence or absence of a delivery guarantee read request from the DMA 13 in response to the read request issued by the delivery guarantee determination unit 113 as indicated in step S13 in FIG. 7 (step S21).

The FRT RC 22 determines whether a read request is received (step S22).

If no read request is received (see a NO route in step S22), the process returns to step S21.

On the other hand, if a read request is received (see a YES route in step S22), the FRT RC 22 reads error information stored in the error information aggregation unit 112 (step S23). Processing performed by the error information aggregation unit 112 in response to the error information reading processing performed by the FRT RC 22 will be described later by using step S33 in FIG. 9.

The FRT RC 22 returns a response including pieces of data at all the addresses in the error information aggregation unit 112 (step S24). Processing performed by the delivery guarantee determination unit 113 in response to the response including the data from the FRT RC 22 has been described above by using step S14 in FIG. 7. The operation performed by the FRT RC 22 in the delivery guarantee process then ends.

Figure 9:
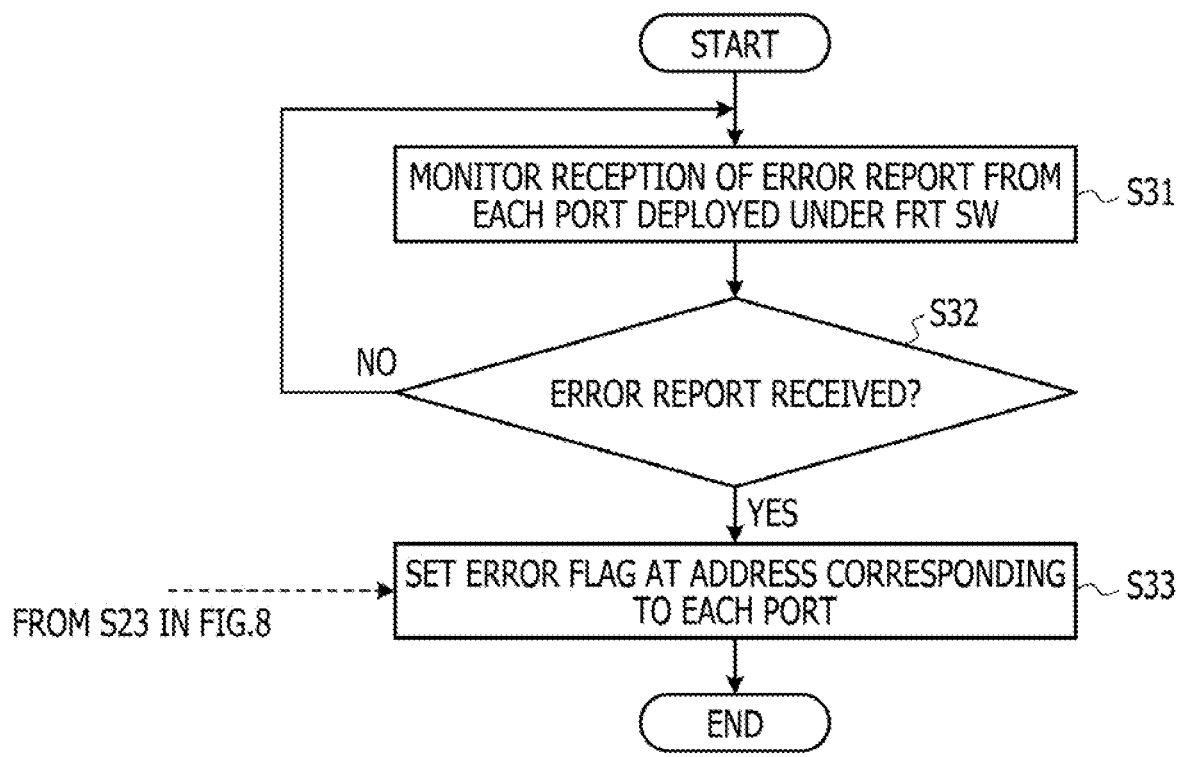
FIG. 9 is a flowchart for describing details of an operation performed by an error information aggregation unit in the delivery guarantee process illustrated in FIG. 6.

Details of an operation performed by the error information aggregation unit 112 in the delivery guarantee process illustrated in FIG. 6 will be described next in accordance with a flowchart (steps S31 to S33) illustrated in FIG. 9.

The error information aggregation unit 112 monitors reception of an error report from each port deployed under the FRT SW 21 (step S31).

The error information aggregation unit 112 determines whether an error report is received (step S32).

If no error report is received (see a NO route in step S32), the process returns to step S31.

Figure 8:
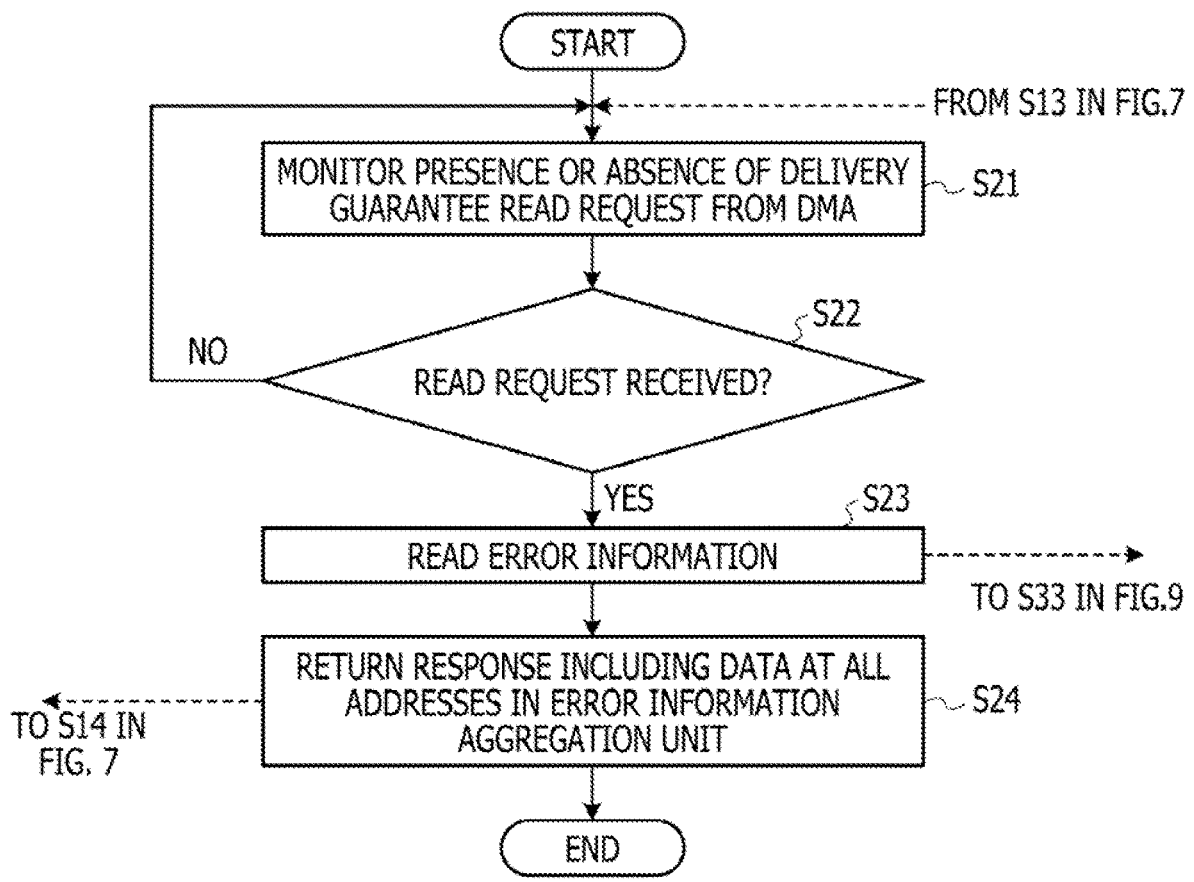
FIG. 8 is a flowchart for describing details of an operation performed by an FRT route complex (RC) in the delivery guarantee process illustrated in FIG. 6.

On the other hand, if an error report is received (see a YES route in step S32), the error information aggregation unit 112 sets an error flag at an address corresponding to each port, and responds to the error information read request issued by the FRT RC 22 as indicated in step S23 in FIG. 8 (step S33). The operation performed by the error information aggregation unit 112 in the delivery guarantee process then ends.

[B] Effects

According to the storage system 100 and an information processing method in one example of the embodiment described above, for example, the following operation effects may be obtained.

The FRT 2 detects an abnormality in each device located between the plurality of CMs 1 and aggregates error information in a register. The CM 1 that is a source of performing the mirror transfer reads content of the register and determines whether the mirror transfer is completed normally, after the mirror transfer is performed.

Thus, in the controller module in the storage system 100, a general-purpose switch may be implemented and the time taken for delivery guarantee may be reduced.

The CM 1 that is the source of performing the mirror transfer determines that the mirror transfer is not completed normally in a case where the error information is written in the register. Thus, it may be recognized that there is a possibility that the mirror transfer is not completed normally because of the occurrence of an abnormality in any of the devices in the storage system 100.

The CM 1 that is the source of performing the mirror transfer determines that the mirror transfer is not completed normally in a case where the CM 1 is unable to read the content of the register. Thus, it may be recognized that there is a possibility that the mirror transfer is not completed normally because of the occurrence of an abnormality in a device located between the CM 1 and the FRT 2.

The FRT 2 aggregates the error information by associating each device with a corresponding address of the register. The CM 1 that is the source of performing the mirror transfer reads the content at all addresses of the register and determines whether the mirror transfer is completed normally. Thus, it may be recognized that there is a possibility that the mirror transfer is not completed normally because of the occurrence of an abnormality in any of the devices in the storage system 100.

The FRT 2 aggregates the error information by associating each device with a corresponding address of the register. The CM 1 that is the source of performing the mirror transfer reads the content at an address related to a path of the mirror transfer among all addresses of the register and determines whether the mirror transfer is completed normally. Thus, the states in the minimum number of devices involved in determining whether the mirror transfer is completed normally may be read, and execution of the restoration process due to the failure of the mirror transfer may be minimized.

Figure 10:
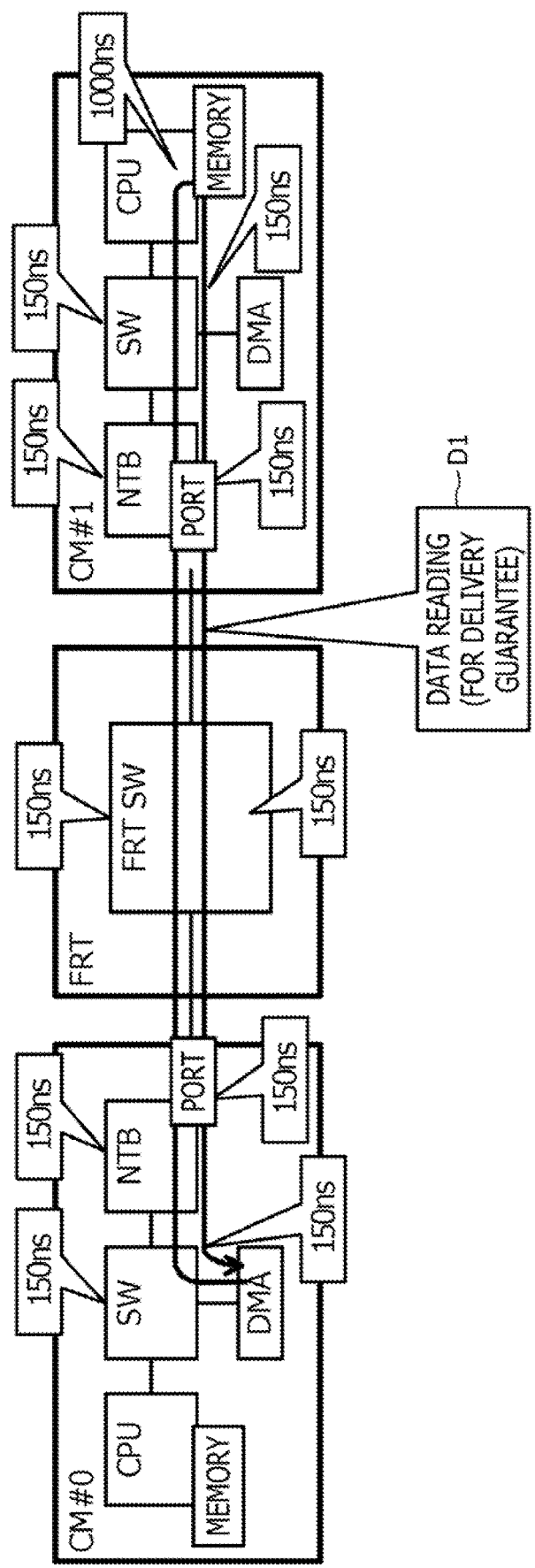
FIG. 10 is a block diagram for describing latency in a delivery guarantee process in a related example.
Figure 11:
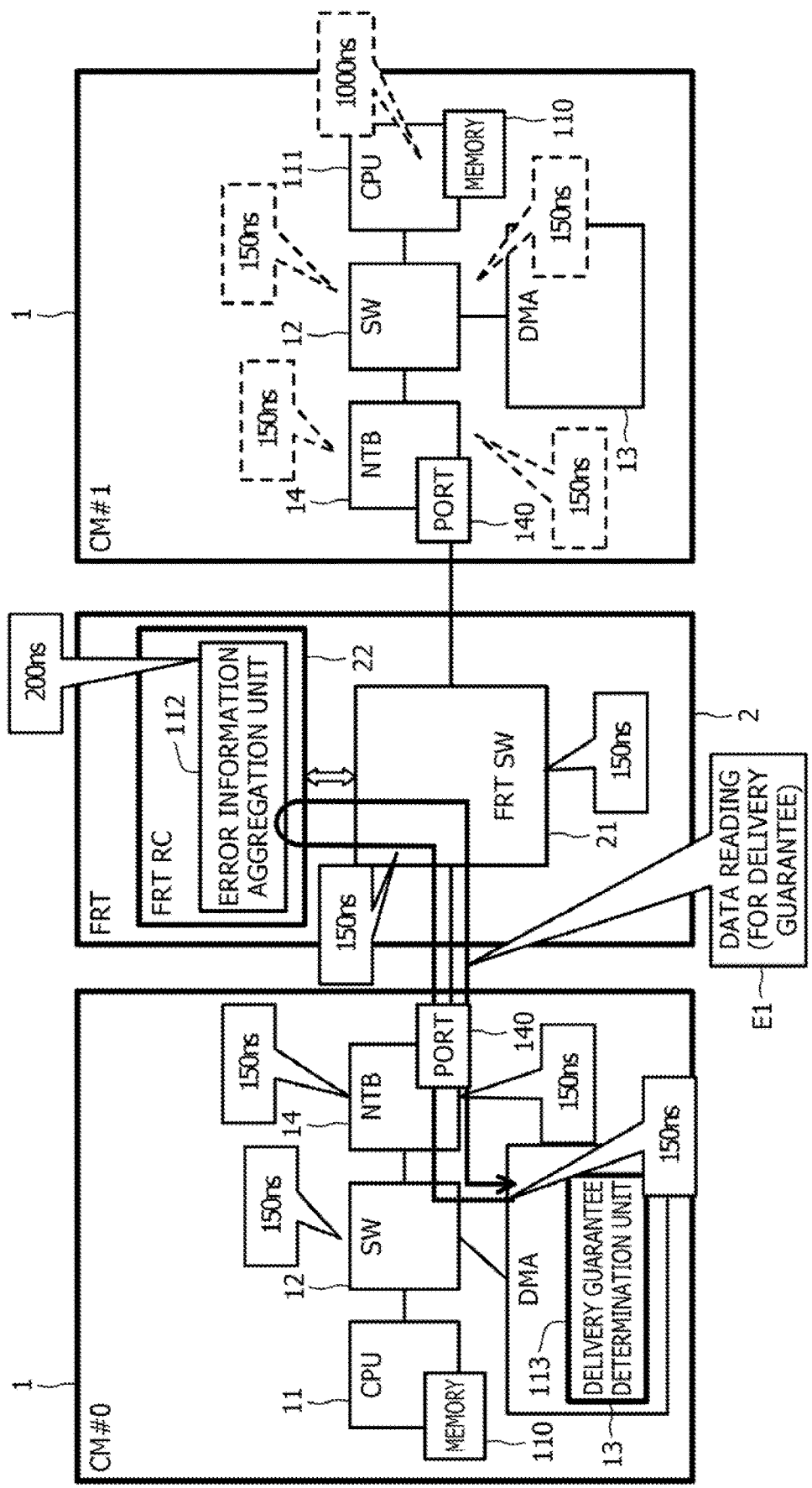
FIG. 11 is a block diagram for describing latency in the delivery guarantee process in the embodiment.

FIG. 10 is a block diagram for describing latency in a delivery guarantee process in a related example. FIG. 11 is a block diagram for describing latency in the delivery guarantee process in the embodiment.

Suppose that latency of passing through each module such as the PCIe SW is 150 ns, memory read latency is 1000 ns, and register read latency of the error information aggregation unit 112 of the FRT RC 22 is 200 ns.

If data reading for delivery guarantee is performed in the related example as indicated by a reference sign D1 in FIG. 10, the data reading takes a time of 150 ns×10+1000 ns=2500 ns.

In contrast, if data reading for delivery guarantee is performed in the embodiment as indicated by a reference sign E1 in FIG. 11, the data reading takes a time of 150 ns×6+200 ns=1100 ns.

As described above, in the delivery guarantee according to the embodiment, the time taken for data reading may be reduced by, for example, 1.4 μs, and thus a reduction in time taken for one mirroring process and improvement in apparatus input/output per second (IOPS) performance may be implemented.

[C] Others

The disclosed technique is not limited to the above-described embodiment, and may be carried out by variously modifying the technique within a scope not departing from the gist of the present embodiment. Each of the configurations and each of the processes of the present embodiment may be selectively employed or omitted as desired or may be combined with each other as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage system comprising:
a plurality of controllers; and
a relay device,
the storage system being configured to perform mirror transfer between the plurality of controllers,
the relay device detects an abnormality in each device located between the plurality of controllers and aggregates error information in a register, and a first controller module that is a source of performing the mirror transfer among the plurality of controllers reads content of the register and determines whether the mirror transfer is completed normally, after the mirror transfer is performed,
the relay device aggregates the error information by associating each device with a corresponding address of the register, and the first controller reads the content at an address related to a path of the mirror transfer among all addresses of the register and determines whether the mirror transfer is completed normally.

2. The storage system according to claim 1, wherein the first controller determines that the mirror transfer is not completed normally in a case where the error information is written in the register.

3. The storage system according to claim 1, wherein the first controller determines that the mirror transfer is not completed normally in a case where the first controller is unable to read the content of the register.

4. The storage system according to claim 1, wherein the relay device aggregates the error information by associating each device with a corresponding address of the register, and the first controller reads the content at all addresses of the register and determines whether the mirror transfer is completed normally.

5. An information processing method comprising:
performing, by a computer in a storage system including a plurality of controllers and a relay device, mirror transfer between the plurality of controllers;
detecting an abnormality in each device located between the plurality of controllers;
aggregating error information in a register;
reading content of the register after the mirror transfer is performed; and
determining whether the mirror transfer is completed normally;
aggregating the error information by associating each device with a corresponding address of the register;
reading the content at an address related to a path of the mirror transfer among all addresses of the register; and
determining whether the mirror transfer is completed normally.

6. The information processing method according to claim 5, further comprising: determining that the mirror transfer is not completed normally in a case where the error information is written in the register.

7. The information processing method according to claim 5, further comprising: determining that the mirror transfer is not completed normally in a case where the first controller is unable to read the content of the register.

8. The information processing method according to claim 5, further comprising: aggregating the error information by associating each device with a corresponding address of the register; reading the content at all addresses of the register; and determining whether the mirror transfer is completed normally.

* * * * *